United States Patent [19]

Scherwitz et al.

[11] 4,379,176

[45] Apr. 5, 1983

[54] ICING HAVING A SUBSTANTIALLY TEMPERATURE INDEPENDENT VISCOSITY

[75] Inventors: Karen Scherwitz, Fort Atkinson, Wis.; James Citti, Minneapolis, Minn.

[73] Assignee: The Pillsbury Company, Minneapolis, Minn.

[21] Appl. No.: 355,270

[22] Filed: Mar. 5, 1982

[51] Int. Cl.³ .............................................. A23G 3/00
[52] U.S. Cl. .................................... 426/613; 426/659; 426/572
[58] Field of Search ........................ 426/572, 613, 659

[56] References Cited

U.S. PATENT DOCUMENTS

| | | | |
|---|---|---|---|
| 3,244,536 | 4/1966 | Kidger | 426/572 |
| 3,253,928 | 5/1966 | Bedink et al. | 426/659 |
| 3,307,953 | 3/1967 | Siebers | 426/613 |
| 3,464,830 | 9/1969 | Wahba | 426/572 |
| 3,600,196 | 8/1971 | Heine et al. | 426/659 |
| 3,849,583 | 11/1974 | Aartsen | 426/659 |
| 4,135,005 | 1/1979 | Cheng | 426/572 |
| 4,146,652 | 3/1979 | Kahn | 426/613 |

*Primary Examiner*—Jeanette M. Hunter
*Attorney, Agent, or Firm*—Robert J. Lewis; Michael D. Ellwein

[57] ABSTRACT

An icing composition which remains pliable and spreadable even at freezer conditions and yet which is also spreadable but not runny at temperatures ranging from room temperature to refrigerator storage temperatures. These characteristics are achieved by careful control of icing total fat content, sugar content, and within the total fat content, having a certain portion of the total fat content comprising liquid oil, and a certain portion comprising hydrogenated shortening, with the ratio of liquid oil:liquid oil plus hydrogenated shortening being within the range of from about 0.26 to 0.43 of oil:1 part of liquid oil plus hydrogenated shortening.

10 Claims, No Drawings

ICING HAVING A SUBSTANTIALLY TEMPERATURE INDEPENDENT VISCOSITY

BACKGROUND OF THE INVENTION

This invention relates to an icing composition which has a substantially temperature independent viscosity (isoviscous) such that it will remain pliable and spreadable at conditions ranging from freezer conditions to room temperature. It is especially designed for use with breakfast pastry products which are cooked, and later frozen. The frozen packaged product is then sold to the user. The consumer or user purchases the product in frozen state, thaws the product, often maintains it at refrigerated temperatures for awhile, and then may warm the product in an oven, a toaster or the like. Such products when packaged, in addition to the pastry, often contain an independent icing package.

The icing in the icing package, or pouch, is designed to be placed on the warmed pastry. However, because it is contained in the same package as the fried and frozen pastry, it necessarily follows that the icing is subjected to a wide variety of temperature conditions. Those conditions range from freezing, to thawed and refrigerated temperatures, to room temperature, and ultimately to warmed oven or toaster temperatures.

Heretofore, it has been very difficult to develop a pouched icing mix which is of suitable icing quality, after subjection to such a wide range of user conditions. Thus, in many instances, products of the type described herein, that is to say, pre-cooked and frozen breakfast pastries, have often employed a very dry, very low moisture content frosting which is spread upon the product before freezing. However, such icing mixes are of low quality, have little or no likeness to conventional icing, and are of very poor taste.

A good icing should, among other things, be soft and spreadable, but not runny at room temperature. It should have a high enough moisture content to allow for a high quality mouth feel and flavor impact; and, particularly for those which will be pouched and subjected to freezing conditions, should have stability over conditions ranging from freezing to room temperature.

Heretofore, a problem with icings which are subjected to such wide and varying conditions is that often if they are spreadable at freezing temperatures, when warmed to room temperature, they become too runny. Conversely, if they hard freeze and are not spreadable at freezer temperatures, during thawing moisture will sublime and in many instances they may become crumbly and dry. Thus, there is a real need for the development of an icing composition, especially designed for pouching and packaging with frozen pre-cooked breakfast pastries, which is substantially temperature independent with respect to its viscosity, such that it will remain pliable and spreadable even at freezing conditions, and yet also be spreadable but not too runny at temperatures ranging from refrigerator storage temperatures to room temperature.

The primary objective of the present invention is to fulfill the real and continuing need described above for a substantially temperature independent (isoviscous) viscosity icing, suitable for pouching and packaging with pre-cooked breakfast pastries.

An additional object of the present invention is to provide an icing as described above which is soft and spreadable, both at freezer conditions and which will also remain soft and spreadable but not too runny at room temperature and above.

An additional object of this invention is to provide an icing as described above which is of high quality in that it, in spite of its desirable viscosity characteristics, has both excellent mouth feel quality and good flavor impact.

An additional object of the present invention is to provide an icing composition suitable for pouching and which has the characteristics previously described, as well as the ability to withstand formula variations in order to achieve any desired flavor.

Another objective of the present invention is to provide an icing which has a frozen shelf life stability of up to at least 12 months.

An additional objective of the present invention is to prepare an icing composition of the type described which is substantially equal to icings normally used fresh in bakeries from the standpoint of translucency, color intensity, sweetness, smoothness, flavor quality, firmness and spreadability.

The method and manner of achieving each of the above objectives, will become apparent from the detailed description of the invention, which will follow hereinafter.

SUMMARY OF THE INVENTION

This invention relates to an icing composition which is characterized as generally equal in overall product quality to fresh bakery icings, but which has a substantially temperature independent viscosity such that it will remain pliable and spreadable through freeze-thaw conditions, without becoming too runny at room temperature. The icing formulation may be varied somewhat as long as it has a critical total fat content, sugar content and water content, with the total fat content itself being a mixture of liquid triglyceride oil and hydrogenated shortening, with the ratio of liquid oil to liquid oil plus shortening being within the range of from about 0.26 to 0.43:1.

The total fat content should be from about 12% to about 20% by weight of the composition, the sugar content from about 30% to about 60% by weight and the water level from about 9% to about 22% by weight. Other ingredients may vary and the product will yet exhibit the characteristics hereinbefore described.

DETAILED DESCRIPTION OF THE INVENTION

The critical formulation parameters which must be maintained in order to achieve the objectives heretofore described for the icing are summarized in the following table.

| CRITICAL PARAMETERS | Approximate % By Weight |
|---|---|
| Total fat content | 12–20 |
| Sugar content | 30–60 |
| Water content | 9–22 |
| Approximate ratio of liquid oil: liquid oil plus shortening in total fat content | 0.26 to 0.43:1 |

It should be understood that as long as the icing composition falls within these critical parameters, the desired freeze-thaw stability and substantially temperature independent viscosity, while still maintaining those desirable attributes of fresh bakery icings, namely: flavor quality, smoothness, good mouth feel, sweetness, glossiness, spreadability, firmness and good cling to the underlying bakery product, can be achieved.

In order to achieve these desirable attributes, the total fat content of the icing composition should be within the range of from about 12% by weight of the composition to about 20% by weight of the composition, preferably within the range of from about 13% to about 17% by weight with about 14% by weight seeming to be best.

If the total fat content is increased above the upper percentage limit mentioned herein, the product firmness will increase to undesirable levels and spreadability decreases. Conversely, it the total fat content is less than the minimum level specified herein, it has been found that the product does not have good clinging properties with respect to pastry surface and in addition, may have a tendency to become too runny.

An important feature of the present invention is formulation of the total fat content. Its composition should not be either all liquid shortening or all plastic shortening, but rather should be a combination of the two, with the ratio of liquid shortening to liquid shortening plus plastic shortening within the range of from about 0.26 to 0.43:1. The liquid shortening plus the plastic shortening is the total fat content. Providing that the ratios of liquid shortening to liquid shortening plus plastic shortening (or solid shortening) are within this range, one may successfully achieve the substantially temperature independent viscosity characteristic of the icing composition, which is so important to an icing which is subjected to the freeze/thaw cycle.

The shortenings which can be employed in the icing composition of the present invention are well known. In regard to the liquid shortening ingredient, any available liquid shortening can be utilized, including those conventionally sold on the market. All of these liquid shortening or oil ingredients are characterized by being high in mono or polyunsaturates and generally contain little, if any, emulsifiers. Those most commonly suitable are unsaturated vegetable oils, such as cottonseed oils, soybean oil, coconut oil, rapeseed oil, peanut oil, olive oil, palm oil, palm kernel oils, sunflower seed oil, wallflower oil, and the like. The most suitable and preferred is winterized soybean oil.

The plastic, or solid shortening or fat, the terms being used interchangeably herein, again can be any of those conveniently available on the market as plastic shortenings. As those skilled in the art know, such plastic shortenings generally are prepared from hydrogenated oils, often with added emulsifiers.

A preferred plastic shortening is one with a monoglyceride content of 3.8±0.2% by weight and a Wiley melting point of 115°±2° F., and a solids fat index (SFI) as follows:

| | |
|---|---|
| 50° F. | SFI 26 ± 3% by weight |
| 70° F. | SFI 20 ± 3% by weight |
| 92° F. | SFI 14 ± 2% by weight |
| 104° F. | SFI 10 ± 2% by weight |

After many experiments and testing, it has been found that the range of ratios specified herein will provide the desirable attributes for the invention. If either the liquid fat is increased and correspondingly the solid fat decreased, or the solid or plastic fat increased and correspondingly the liquid fat decreased, even though the total fat content remains within the levels earlier specified herein, it has been found that there is an undesirable effect upon the important characteristic of a substantially temperature independent viscosity.

It is preferred that the plastic shortening contain some mono or diglyceride emulsifying agent, and preferably from about 3.5% to about 4% by weight.

The sugar content of the icing composition is also important. The sugar content should be within the range of from about 30% to about 60% by weight, preferably from about 40% to about 58% by weight, and most preferably around 57–58% by weight. Providing that the sugar content is within this range, coupled with the other parameters as hereinbefore mentioned, the desired icing composition attributes are attained. It has been found that the sugar employed should be powdered sugar of a particle size within the range of from about 6X to about 12X, most preferably about 12X.

Finally, it is important to carefully adjust and maintain the overall total water content within the range of from about 9% to about 22% by weight and preferably within the range of from about 14% to about 17% by weight.

While the applicant does not know all of the complex physical and chemical phenomena which are occurring within the composition during a freeze/thaw cycle, as well as those which are occurring when the icing composition is subjected to much higher temperatures; it has been found that because of the cooperative interaction of the ingredients, if they are maintained within the parameters specified herein, the net result is a uniquely stable, high quality, icing composition. Importantly, such a result has not heretofore been achieved. Thus, the prior art compositions have necessarily sacrificed quality characteristics when making an icing suitable for pouching, along with pre-cooked and frozen bakery products.

Numerous other ingredients besides those mentioned as falling within the critical parameters table described above may be employed in icing compositions, as those skilled in the art know. For example, other typical ingredients may include corn syrup solids, salt, flavoring, surfactants, coloring, gums, and the like. These may be varied, as desired, within reasonable use levels.

Thus, the levels of these additional ingredients may vary considerably, almost at the formulator's will, without having any significant effect upon the overall icing attributes, providing that the critical parameters remain as hereinbefore described. Thus, an important attribute of the final composition is achieved, namely formulation versatility.

The following example will serve to illustrate, but not limit, the icing composition of the present invention.

EXAMPLE

An icing was prepared having the formulation shown in the table below.

| TABLE OF ICING COMPOSITION | |
|---|---|
| Ingredient | % By Weight |
| Water | 15.254 |
| Corn syrup solids | 1.916 |
| Salt | 0.449 |
| Vanilla | 0.045 |
| Butter vanilla | 0.018 |
| Polysorbate 60 | 0.067 |
| Color solution | 0.007 |
| Powdered sugar (12X) | 57.002 |

TABLE OF ICING COMPOSITION

| Ingredient | % By Weight |
| --- | --- |
| Whey | 4.487 |
| Xanthan gum | 0.064 |
| Shortening | 9.045 |
| Oil | 5.312 |
| Invertose | 3.167 |
| Liquid Dextrose | 3.167 |
| | 100.000 |

The icing composition was made up in the following manner. The water was metered into a conventional mixing tank along with the corn syrup solids. Salt, vanilla, butter vanilla, polysorbate 60 were added and mixing was continued until it was uniform, for about from five to ten minutes. The temperature was maintained within the range of about 80-90° F. Thereafter, the powdered sugar, dextrose, whey and Xanthan gum were dry mixed in a ribbon blender at low speed about 30 rpm along with the plastic shortening. Mixing continued for about five minutes. About 15% of the previously described water solution was added and mixing continued at high speed for about one minute. Thereafter, the remaining portion of the above described water solution was added and mixing continued until the product exhibited uniformity in appearance, texture and quality.

Samples of this product were packaged in ten gram quantities in conventional frosting pouch type tetrapacks. Samples were stored at 0° F. Thereafter, the samples were placed upon a warm raised donut for evaluation by consumers. The products were evaluated based upon the following criteria:

(1) Ease of application
(2) Appearance
    (a) smoothness
    (b) color intensity
(3) Sensory taste
    (a) flavor intensity
    (b) off flavor
    (c) smoothness The icing was evaluated by a panel of skilled individual testers. It was compared with a control icing which was fresh.

On all significant characteristics, the product of the present invention, compared very favorably with a conventional control icing, even though the product of the present invention had been subjected to drastic freeze/thaw cycles. The results of testing before the panel are shown in the enclosed table.

SENSORY EVALUATION RESULTS

| | Hedonic | Preference | Intensity | Translucency | Smoothness | Sweetness | Flavor Quality |
| --- | --- | --- | --- | --- | --- | --- | --- |
| Control | 6.5 | 56% | 3.8 | 3.1 | 4.5 | 4.8 | 4.6 |
| Invention | 6.6 | 44% | 4.0 | 3.9* | 4.6 | 4.8 | 4.6 |

*Significant difference at the 5% level.

REASONS FOR PREFERENCE

| | Control | Invention |
| --- | --- | --- |
| FLAVOR | | |
| Better flavor | 9 | 7 |
| More buttery flavor | | 1 |
| Less Sweet | 4 | 3 |
| More overall flavor | | 4 |
| Sweetness level | 1 | 1 |

REASONS FOR PREFERENCE

| | Control | Invention |
| --- | --- | --- |
| TEXTURE | | |
| Better texture | 6 | |
| Smoother and Creamier | 4 | 6 |
| Consistency | 1 | 1 |
| Thicker | 3 | |
| Light texture | | 3 |
| Pleasant mouthfeel | | 1 |
| Firmer | 1 | |
| APPEARANCE | | |
| Better appearance | 3 | 2 |
| Better color | | 2 |
| Translucency | 1 | |

It can be seen that the two were substantially indistinguishable in spite of the fact that the invention composition had undergone much more drastic conditions. This shows that even though the invention icing was substantially temperature independent from the standpoint of viscosity, it achieved these desirable properties without any significant sacrifice in overall quality. Thus, the invention can be seen to have achieved at least all of its stated objectives.

What is claimed is:

1. An icing composition which has a substantially temperature independent viscosity and remains pliable and spreadable even at freezing conditions, and yet which is spreadable and not runny at temperatures ranging from room temperature, to refrigerator storage temperatures, comprising:

an icing formulation having a total fat content of from about 12% by weight to about 20% by weight, from about 30% to about 60% by weight of powdered sugar, from about 9% to about 22% total water content by weight, with the total fat content comprising a mixture of liquid oil and hydrogenated shortening, and the ratio of liquid oil to liquid oil plus shortening being from within the range of about 0.26 to 0.43:1.

2. The icing of claim 1 wherein said powdered sugar is from about 6X to about 12X particle size.

3. The icing of claim 1 wherein said liquid oil is winterized soybean oil.

4. The icing of claim 3 wherein said shortening is a hydrogenated vegetable shortening.

5. The icing of claim 4 wherein said shortening has a monoglyceride content of from 3.5% to 4.0% by weight.

6. The icing of claim 5 wherein said shortening has a Wiley melting point of about 113° F. to about 117° F. and a solids fat index of from about 23% to 29% by weight, at 50° F., about 17% to 23% by weight at 70° F., from about 12% to 16% by weight at 92° F. and from about 8% to 12% by weight at 104° F.

7. The icing of claim 1 wherein the total water content is from about 14% to about 17% by weight.

8. The icing of claim 1 wherein the total fat content is from about 13% to about 17% by weight.

9. The icing of claim 1 wherein the total fat content is about 14% by weight.

10. The icing of claim 2 wherein the powdered sugar content is from about 40% to about 58% by weight.

* * * * *